(12) United States Patent
Edgren et al.

(10) Patent No.: US 7,957,541 B2
(45) Date of Patent: Jun. 7, 2011

(54) ACOUSTIC COMPLIANCE ADJUSTER

(75) Inventors: Dan Anders Edgren, Stockholm (SE); Markus Mimer, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1186 days.

(21) Appl. No.: 11/307,223

(22) Filed: Jan. 27, 2006

(65) Prior Publication Data

US 2007/0177742 A1 Aug. 2, 2007

(51) Int. Cl.
*H04R 1/02* (2006.01)

(52) U.S. Cl. ......... 381/89; 381/97; 381/94.1; 455/569.1

(58) Field of Classification Search ............. 381/89, 381/111, 401, 396, 335, 420, 303, 59, 94.1, 381/94.2, 94.3, 96, 97, 98, 346, 347, 348, 381/354; 455/569.1, 149, 350

See application file for complete search history.

(56) References Cited

U.S. PATENT DOCUMENTS

| | | | | |
|---|---|---|---|---|
| 4,961,226 | A * | 10/1990 | Saffran | 381/303 |
| 5,073,945 | A * | 12/1991 | Kageyama et al. | 381/89 |
| 5,537,479 | A * | 7/1996 | Kreisel et al. | 381/96 |
| 2005/0180592 | A1* | 8/2005 | Miura | 381/401 |
| 2005/0221867 | A1* | 10/2005 | Zurek et al. | 455/569.1 |
| 2007/0127740 | A1* | 6/2007 | Gustavsson | 381/111 |
| 2008/0317255 | A1* | 12/2008 | Cozens et al. | 381/71.6 |

FOREIGN PATENT DOCUMENTS

| | | |
|---|---|---|
| EP | 1560400 | 8/2005 |
| JP | 03-228499 | 10/1991 |
| JP | 06-030491 | 2/1994 |
| JP | 08-168090 | 6/1996 |
| JP | 2002058094 | 2/2002 |
| JP | 2004-032686 | 1/2004 |
| JP | 2004-343286 | 12/2004 |
| JP | 2005-277451 | 6/2005 |
| WO | 9534184 | 12/1995 |
| WO | WO 9534184 A1 * | 12/1995 |
| WO | 01/33904 | 5/2001 |

OTHER PUBLICATIONS

Written Opinion from corresponding PCT Application No. PCT/EP2006/064038.

* cited by examiner

*Primary Examiner* — Vivian Chin
*Assistant Examiner* — Friedrich Fahnert
(74) *Attorney, Agent, or Firm* — Renner, Otto, Boisselle & Sklar, LLP

(57) ABSTRACT

A speaker arrangement is described, suitable for improving the sound quality of a small size first speaker. The arrangement comprises a cavity, to which the first speaker is acoustically coupled. A second speaker is also acoustically coupled to the cavity, and the first and second speakers are excited in phase with each other. The first speaker may be an earphone speaker tuned to be held to a user's ear, whereas the second speaker may be a larger ring alert speaker with lower compliance than the first speaker, both of which are incorporated in the same mobile phone. By exciting the second speaker in phase with the first speaker, the second speaker will aid the smaller first speaker's reproduction of sound, particularly in the lower frequency range.

27 Claims, 3 Drawing Sheets

ACOUSTIC COMPLIANCE ADJUSTER

FIELD OF THE INVENTION

The present invention relates to speaker arrangement including a first speaker configured to operate under certain conditions. A second speaker, acoustically coupled to the first speaker, is excited in phase with the first speaker, thereby adjusting the compliance of the first speaker. The invention is particularly suitable when the first speaker is a small size earphone speaker, where distortion tends to be a problem which increases with smaller speaker dimension.

BACKGROUND

A portable communication terminal, e.g. a mobile phone, typically comprises at least one speaker, or transducer, adapted to be held to a user's ear for providing sound during speech communication with a remote party. Such a speaker, herein called an earphone speaker, is therefore configured to cooperate with the acoustic compliance provided by the cavity formed by the outer ear when held over an output for the speaker. A general trend among portable devices in general, and mobile phones in particular, is miniaturization. The technologies surrounding manufacture of batteries, antennas, and electronics have developed rapidly over the last decades, making it possible to provide pocket size mobile phones with ever increasing performance. However, at some point there will be contradictory interests, in that the terminal should be as small as possible, and at the same time have an attractive user interface. The progress in display technology has therefore had a large impact on mobile phone design, and today all major mobile phone manufacturers provide terminals with high performance multi-color displays. So, as the displays get larger and an overall compact terminal is desired, the layout of the terminal has to be looked over.

The audio interface of the mobile phone includes a microphone and a speaker. However, these elements provide no visual advantage, and should therefore be a small as possible. For the speaker, this is a problem since the smaller the diameter or area of the speaker the higher the acoustic compliance, and a speaker with a high compliance membrane will distort more than a low compliance membrane.

Modern mobile phones should be able to produce two types of acoustic signals, low level phone type signals in phone operation mode, typically the voice of the person to whom the user of said portable communications device is communicating, and high level alert type signals in alert operation mode. In order to produce acoustic output signals at these two different levels two different transducers have traditionally been used. However, since the reproduction demands of the alert signal have risen in connection with polyphonic ring signals, and since the importance of small sizes of the mobile phones has increased, mobile phones containing one speaker only have been presented. In order to produce the two levels of acoustic signals, the same transducer is excited with two different electric signal levels. Also, in the phone mode the mobile phone typically held the against user's ear, whereas in the alert mode the mobile phone is typically placed so that the speaker can send the acoustic signals into free air space. This difference of what the speaker faces in the phone mode as compared to the alert mode, means that the mobile phone experiences two different acoustic impedance scenarios.

International application published as WO01/33904 presents an attempt to minimize such impedance differences, by introducing various openings in a housing containing the speaker, in order to achieve a system that is so called "leak-tolerant", i.e. tolerant to air leakages between a user's ear and the face of the phone designed to be held against said user's ear. However, this kind of approach gives rise to distortion either when the transducer is driven in alert mode or when it is used in phone mode. This is mainly due to impedance mismatch, and the approach to minimize the influence of the user's on the performance of a phone is not adequate in order to achieve an essentially distortion-free performance in both alert and phone mode. Furthermore, the leak tolerant solution works comparatively well with a low acoustic compliance speaker, but as the dimensions of the speaker decreases the acoustic compliance increases. The introduction of a hole between the front and back of speaker also increases the harmonic distortion of the system due to a higher acoustic load of the membrane.

SUMMARY OF THE INVENTION

There is consequently room for improvement in the art of compact speaker arrangements. More particularly, it is one object of the invention to solve or alleviate the problem of distortion in small diameter earphone speakers.

A problem also related to the miniaturization of compact mobile phones, relates to artificial testing of the acoustic properties of a mobile phone. In production, the acoustical properties of a phone are typically tested using some sort of artificial ear, or with more appropriate nomenclature coupler, simulating the acoustical impedance of the human ear. The coupler is applied with a specific sealing over the output aperture in the same manner a real human ear would. The speaker is then subjected to either broadband stimuli or a discrete sinusoidal tone with varying frequency. A microphone housed within the artificial ear coupler delivers the output of the system. The Fourier transform of this output is called the frequency response and evaluated according to specifications at hand. However, the output aperture for a small size earphone speaker tends to be positioned at or very close to an edge of the phone housing. As a result of this design, such a speaker output aperture is typically not covered tightly by a user's ear when in use. A coupler simulating a real user ear therefore should not engage tightly about the output aperture either. A problem with such a setup is that background noise may disturb measurement of the frequency response.

The invention as proposed herein involves the idea of providing a speaker arrangement including a mechanism for active adjustment of the acoustic compliance for a speaker. For a portable device, such as mobile phone, this function is provided by acoustically connecting a secondary speaker with larger diameter and comparatively low acoustic compliance to the back volume of the smaller front speaker. The larger back speaker will aid the smaller front speaker's reproduction of lower frequencies by better matching of the front speaker's cavity impedance. The acoustic connection between the speakers can be achieved with a channel solution, a waveguide, or simply by letting the two speakers share the same back cavity. For a mobile phone equipped with two speakers, a small earphone speaker and a larger ringer alert speaker, the sound quality of the former can be improved by connecting these two acoustically and simultaneously exciting both speakers in phase.

One embodiment of the invention includes a speaker arrangement, comprising:
  a cavity, defined by a number of boundary walls,
  a first speaker having one side acoustically coupled to the cavity;

a second speaker having one side acoustically coupled to the cavity;

a speaker signal generator device connected to excite the first speaker and the second speaker in phase with each other.

In one embodiment, the speaker signal generator device is configured to excite the first speaker and the second speaker in phase so as to simultaneously oscillate towards and away from the interior of the cavity.

In one embodiment, the speaker signal generator device is configured to excite the first speaker and the second speaker in phase so that the first speaker oscillates towards the interior of the cavity when the second speaker oscillates away from the interior of the cavity.

In one embodiment, the speaker signal generator device is configured to excite the first speaker at a higher amplitude than the second speaker.

In one embodiment, the speaker signal generator device is connected to the second speaker over a signal attenuator.

In one embodiment, the speaker signal generator device comprises a first generator connected to the first speaker, a second generator connected to the second speaker, and a phase-locking unit connected to the first and second signal generator.

In one embodiment, the first speaker is positioned inside the cavity, attached over an aperture formed in a first boundary wall of the cavity.

In one embodiment, the second speaker is positioned inside the cavity, attached over an aperture formed in a second boundary wall of the cavity.

In one embodiment, the cavity is sealed to the exterior thereof.

In one embodiment, the a partition wall is formed in the cavity, dividing the cavity into a first sub-cavity and a second sub-cavity, and wherein a pressure transferring member is formed in the partition wall.

In one embodiment, the pressure transferring member comprises an aperture.

In one embodiment, the pressure transferring member comprises a membrane.

In one embodiment, the second speaker has lower acoustic compliance than the first speaker.

Another embodiment of the invention includes a mobile phone, comprising:

a housing;

a cavity defined within the housing by a number of boundary walls;

a first speaker within the housing, having a first output side coupled to a first opening in the housing, and a first backside acoustically coupled to the cavity;

a second speaker within the housing, having a second output side coupled to a second opening in the housing, and a second backside acoustically coupled to the cavity;

a speaker signal generator device connected to excite the first speaker and the second speaker in phase with each other.

In one embodiment, the speaker signal generator device is configured to excite the first speaker and the second speaker in phase so as to simultaneously oscillate towards and away from the interior of the cavity.

In one embodiment, the speaker signal generator device is configured to excite the first speaker at a higher amplitude than the second speaker.

In one embodiment, the first speaker is an earphone speaker configured to operate in phone mode by transmitting sound to a user's ear placed over the first aperture in the housing, the second speaker is connected to an audio player unit and configured to operate in alert mode or audio player mode by transmitting sound to free air through the second aperture in the housing, and wherein the second speaker assists the first speaker in phone mode.

In one embodiment, the first opening in the housing is formed in a front side of the phone and the first speaker and the second opening in the housing is formed in backside of the phone, wherein the first and second speakers are positioned such that their backsides face each other.

In one embodiment, the second speaker has lower acoustic compliance than the first speaker.

Another embodiment of the invention includes a test rig for measuring acoustic quality of a speaker arrangement, including:

an acoustic device comprising
  a housing;
  a first speaker within the housing, having a first output side coupled to an opening in the housing, the first speaker being configured to transmit sound to a user's ear placed over the aperture; an artificial ear device comprising:
  a cavity defined by boundary walls;
  an opening in a boundary wall shaped to fit with sealed engagement over the aperture in the housing;
  a second speaker having a second output side acoustically coupled to the cavity;
a speaker signal generator device connected to excite the first speaker and the second speaker in phase with each other.

In one embodiment, the speaker signal generator device is configured to excite the first speaker and the second speaker in phase so that the first speaker oscillates towards the interior of the cavity when the second speaker oscillates away from the interior of the cavity.

In one embodiment, the artificial ear device includes:
a coupler, and
an adapter member comprising
  a through hole;
  a first side shaped to fit to the housing with the through hole over the aperture in the housing;
  a second side shaped to fit over the opening to the cavity as formed by the coupler.

In one embodiment, the speaker signal generator device is included in the housing.

In one embodiment, the speaker signal generator device is configured to excite the first speaker at a higher amplitude than the second speaker.

BRIEF DESCRIPTION OF THE DRAWINGS

The present invention will be clearly understood from the following description of the preferred embodiments of the present invention, read in conjunction with the attached drawings in which.

DETAILED DESCRIPTION OF PREFERRED EMBODIMENTS

The present invention relates to a speaker arrangement configured such that a first speaker is acoustically affected by a second speaker excited in phase with the first speaker. The invention is as such particularly suitable for speaker arrangements where the physical dimensions of the first speaker are small, which as such tends to increase distortion. One example of such a speaker arrangement is, as mentioned, the speaker arrangement of a mobile phone where a compact design is a major market requirement. In this context, mobile phone is intended to include portable phones devised to communicate with a base station unit, whether the base station unit be a radio station in a cellular network, or e.g. a DECT station. The invention will therefore be described below with reference to embodiments where the first speaker is the earphone speaker configured to be held to a user's ear in operation. Furthermore, it should be emphasized that the term comprising or comprises, when used in this description and in the appended claims to indicate included features, elements or steps, is in no way to be interpreted as excluding the presence of other features elements or steps than those expressly stated. It should also be noted that different expressions for well known features are used in the related art, where e.g. speaker is sometimes referred to as loudspeaker, a transducer or a receiver. Herein, the word speaker will mainly be used, which defines an element devised to receive an electric audio signal and to transform the audio signal to mechanical vibrations to generate an acoustic signal, e.g. by means of a membrane. The actual design of the speakers usable in the presented embodiments is not of specific importance, and will therefore not be dealt with any further detail.

Preferred embodiments will now be described with reference to the accompanying drawings.

Figure 1:
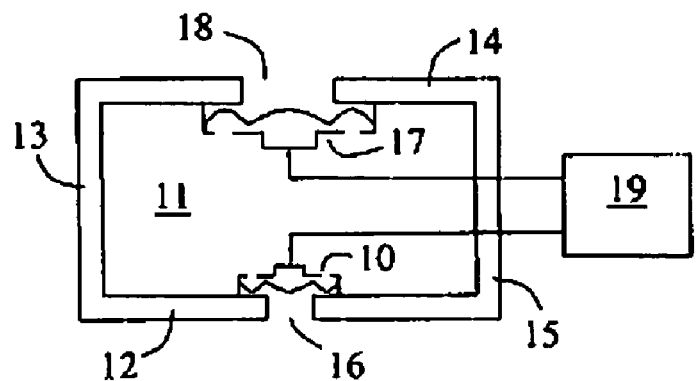
FIG. 1 illustrates a speaker arrangement according to an embodiment of the invention.

FIG. 1 schematically illustrates a most basic embodiment of a speaker arrangement according to the invention. A first speaker 10 is positioned at the lower end of the drawing, having a first side facing downwards. A second side of speaker 10, opposing the first side, is acoustically coupled to a cavity 11 defined by a number of boundary walls 12-15. The drawing shows a cross-sectional view through cavity 11, but it should be realized that additional front and back walls are included to substantially or completely enclose cavity 11. In the illustrated embodiment, first speaker 10 is located inside cavity 11, attached over an aperture 16 formed in a first boundary wall 12 of the cavity. An alternative design is to attach the first speaker 10 outside cavity 11, with an acoustic connection there between, such as a conduit or merely an aperture in wall 12. In any case, cavity 11 acts as a backside acoustic cavity for speaker 10, typically a backside cavity.

A second speaker 17 is also included, having one side in acoustic connection with cavity 11. In the drawing, speaker 17 is attached inside cavity 11, over a second aperture 18 formed in a boundary wall 14. As for the first speaker 10, also second speaker 17 may optionally be positioned outside cavity 11, acoustically connected thereto by means of a conduit or an aperture.

In the embodiment shown in FIG. 1, the side facing the cavity 11 may be referred to as the backside of the second speaker, whereas the side facing aperture 18 may be called the output side of speaker 17. However, which side is to be called the output side is really a matter of the intended use of second speaker 17. If the major intended use of speaker 17 is to provide acoustic signals away from cavity 11, i.e. upwards in the drawing, the outwards facing side would typically be called the output side. One such embodiment is where the first speaker 10 is an earphone speaker and the second speaker 17 is a ring alert loudspeaker, both of which are included in a mobile phone. For this embodiment the outwards facing side of speaker 17 may be referred to as the output side. If, on the other hand, the major or only purpose of implementing speaker 17 is to assist the first speaker 10 for the purpose of adapting the impedance sensed by first speaker 10, it would be more appropriate to refer to the inwards facing side of speaker 17 the output side. One such embodiment is where the first speaker 10 is an earphone speaker in a mobile phone, whereas the second speaker 17 is an assisting speaker of a test rig for measuring the sound quality provided by the first speaker in a simulated mode of operation. For this embodiment the inwards facing side of speaker 17 may be referred to as the output side. Examples of both of these embodiment will be described in greater detail below.

The speaker arrangement of FIG. 1 further includes a speaker signal generator device 19, connected to both to the first speaker 10 and to the second speaker 17. Furthermore, speaker signal generator device 19 is configured to provide audio signals to excite the first speaker and the second speaker in phase with each other. this means that the same signal is sent to both speakers, in terms of frequency and phase, since two signals can only be in phase if they oscillate with the same frequency, even though the frequency varies. Since the two speakers 10 and 17 oscillate in phase with each other, the effect for first speaker 10 will be an adjustment of the acoustic impedance. Second speaker 17 is preferably excited with a lower amplitude than first speaker 10, so that the sound output through aperture 16 will in effect be the acoustic waves generated by first speaker 10, under compliance influence by speaker 17. Preferably, the second speaker 17 is also larger than first speaker 10, thereby in itself having lower compliance than first speaker 10.

Figure 2:
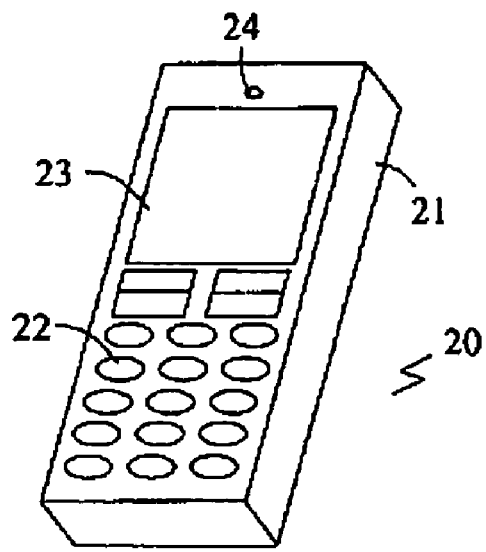
FIG. 2 illustrates a mobile phone in which a speaker arrangement according to the invention is implemented.

FIG. 2 illustrates a mobile phone 20, comprising a housing 21 and a user interface including a keypad or keyboard 22 and a display 23. The actual layout of the interface is of no importance to the invention, and the mobile phone shown in FIG. 2 merely serves to provide an example of a deign in which the present invention may be employed. Alternative designs for a mobile phone include clamshell or jack knife type terminals, in which the present invention may also be employed. Mobile phone 20 also comprises an audio interface including a microphone (not shown) and an earphone speaker, such as first speaker 10 of FIG. 1, an output side of which is acoustically connected to an opening 24 in housing 21. Earphone speaker 10 may be attached immediately behind opening 24, or spaced from opening 24 but acoustically connected to the opening by a conduit or wave guide. Though not shown, mobile phone 20 typically also comprises radio transceiver circuitry, an antenna, a battery, and a microprocessor system including associated software and data memory for radio communication, all contained within housing 21. The specific function and design of the terminal as such is of little importance to the invention, and will therefore not be described in any greater detail.

Figure 3:
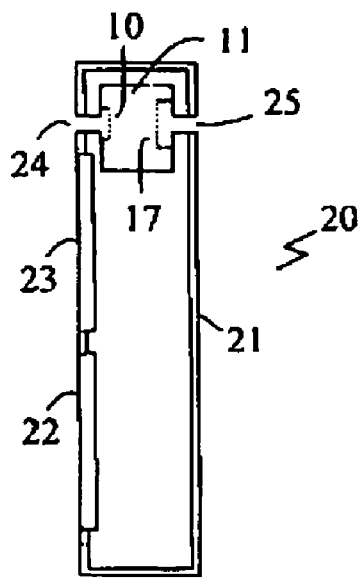
FIG. 3 illustrates a cross-sectional side view of the phone of FIG. 2.

FIG. 3 schematically illustrates a cross-sectional side view of phone 20. In this drawing an interior structure corresponding to FIG. 1 is shown as forming part of phone 20. Apart from the first speaker 10, the earphone speaker, phone 20 further includes a ring alert speaker 17. Speakers 10 and 17 are acoustically connected by sharing a common cavity 11. Ring alert speaker 17 has an output side facing an opening 25 formed in the backside of phone 20. In the context of the present invention, a ring alert speaker may not merely be used for playing alert signals, but may also be coupled to an audio player unit devised to play e.g. mp3 files, and thereby serve as a loudspeaker for playing music through opening 25 in a free air space arrangement. As for opening 24, opening 25 need not be present immediately over the output side of speaker 17, but may alternatively be acoustically connected to speaker 17 in other ways. A speaker signal generator device 19 is connected to both to the first speaker 10 and to the second speaker 17 as in FIG. 1, but is left out in this drawing for the sake of clarity.

Figure 4:
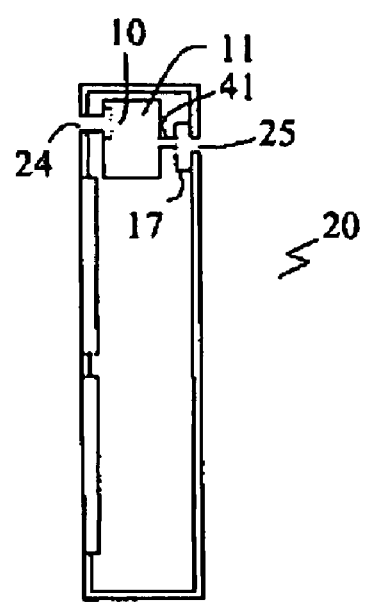
FIG. 4 illustrates an alternative design to the phone of FIG. 3.

In FIG. 3, the speakers 10 and 17 are arranged in relation to cavity 11 as in FIG. 1, i.e. they are attached to inside walls of cavity 11. As is shown in FIG. 4, merely for the sake of illustrating an alternative layout, ring alert speaker 17 is positioned outside cavity 11, but connected thereto by a conduit 41. A corresponding arrangement could instead or additionally be used for earphone speaker 10.

Figure 5:
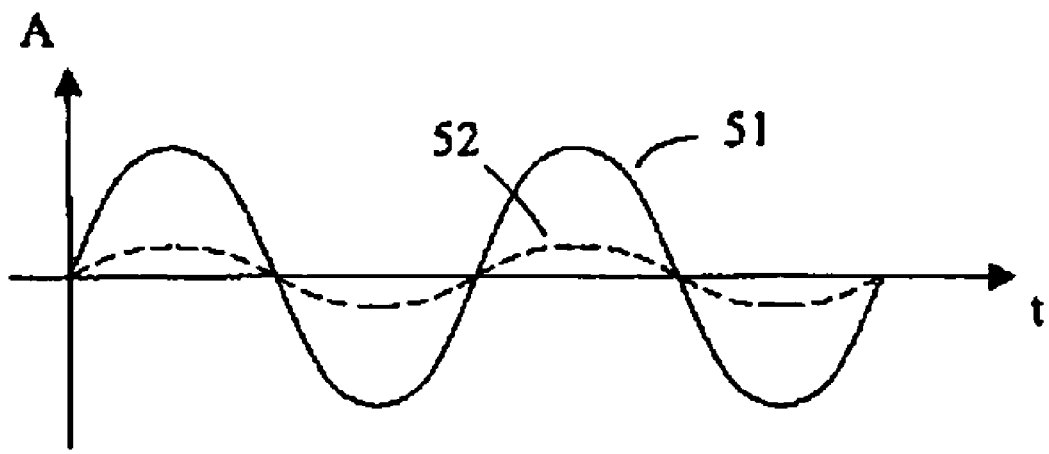
FIG. 5 illustrates audio signals for exciting the speakers in a speaker arrangement according to an embodiment of the invention, where a second speaker is excited to improve the sound quality of the first speaker.

FIG. 5 illustrates in a most schematic way an audio signal 51 provided by speaker signal generator device 19 to earphone speaker 10 in phone 40. The audio signal is represented in the time domain t, and represents a brief single frequency signal, merely as an example. The vertical axis represents the amplitude A of the audio signal provided to excite speaker 10. Furthermore, speaker signal generator device 19 excites ring alert speaker 17 with a corresponding audio signal 52, which is in phase with audio signal 51. A positive amplitude represents oscillation towards cavity 11, and a negative amplitude represents oscillation away from cavity 11. With reference to FIGS. 3 and 5, speakers 10 and 17 are consequently excited to oscillate with in phase with each other, towards and away from each other. The amplitude of audio signal 52 is preferably lower than the amplitude of audio signal 51, such that the low compliance ring alert speaker 17 will assist but not dominate over earphone speaker 10. The amplitude ratio between signals 51 and 52 is tuned dependent on the needs and requirements at hand. In one embodiment, earphone speaker 10 has an area in the range of 40-100 $mm^2$, whereas the ring alert speaker 17 has an area in the range of 80-300 $mm^2$. The speakers may be circular or rectangular. The intermediate common cavity may have a volume in the range of 1-5 $cm^2$. A speaker arrangement with dimensions within these ranges have been successfully tested, with minimized distortion in the acoustic signal at the output side of earphone speaker 10 as a result. When speakers 10 and 17 are excited to oscillate in phase towards and away from each other, the larger second speaker 17 will aid the smaller first speaker's reproduction of lower frequencies, typically <1 kHz, by better matching of the first speaker's cavity impedance. Furthermore, distortion will be decreased in the reproduced sound, rendering an improvement in the sound quality.

A second embodiment of the invention will now be described, where two cooperating speakers are operatively combined and excited, but do not form part of the same carrying structure as in a phone.

Figure 7:
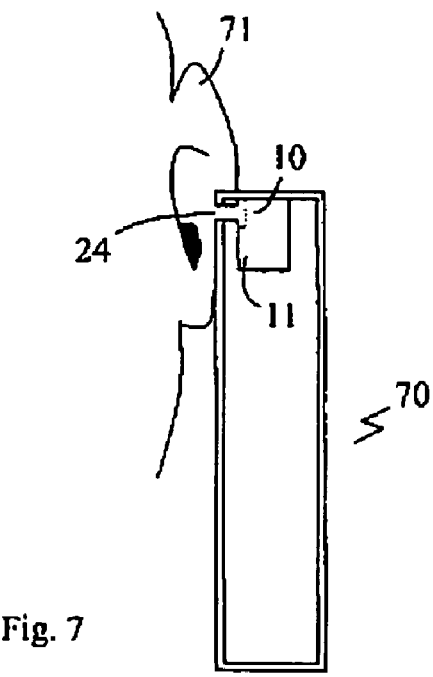
FIG. 7 illustrates a phone held with its speaker output to a user's ear.
Figure 8:
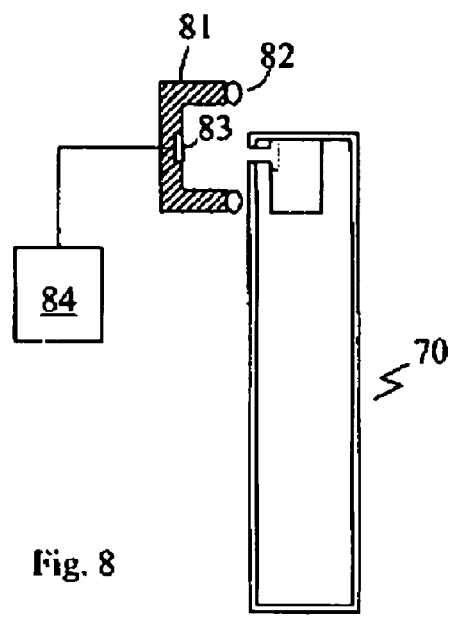
FIG. 8 illustrates a measurement setup for testing the sound quality of a speaker in a phone using a coupler.

FIG. 7 illustrates use of phone 70 for normal speech communication, as held to a user's ear 71. Phone 70 may be identical to phone 20, but need not be. The same reference numerals are used for corresponding elements, though. What differs the phone 70 of FIG. 7 from phone 20 is that it need not comprise two speakers. Phone 70 is illustrated as comprising an earphone speaker 10, acoustically connected to a cavity 11. A ring alert speaker 17 may or may not be included. What is indicated in FIG. 7 is that with the small mobile phones of today, the speaker opening 24 is often positioned so close to the upper edge of the phone 70, that it is not possible to securely press the phone tightly to the ear. Speaker 10 must therefore be configured to operate with a load provided by the ear, which represents a fairly open cavity defined by the outer ear 71. Consequently, when testing the sound quality of the phones in production, a coupler should theoretically be positioned to the speaker opening 24 similar to how the ear would be positioned. This is schematically illustrated in FIG. 8, where coupler 81 is shown in cross-section. Preferably, coupler 81 has a cylindrical shape with a seal 82 about an open end arranged to be held to the phone 70. A microphone 83 is provided in coupler 81, coupled to a signal recording device 84, configured to collect the measured sound and evaluate the frequency response of earphone speaker 10. A measurement setup according to FIG. 8 is not desirable, though, and a way of overcoming this is to introduce an adapter plate between the phone 70 and the coupler 81. The leak normally occurring between the output opening 24 and the ear channel is then simulated by providing holes in the wall of coupler 81. However, sound measurements with such a setup are preferably performed in a quiet surrounding, since any sound passing to the coupler through the holes might otherwise taint the results of the measurements. Making sound quality measurements of each and every phone in a sound-proof environment is fairly expensive and cumbersome, though.

Figure 9:
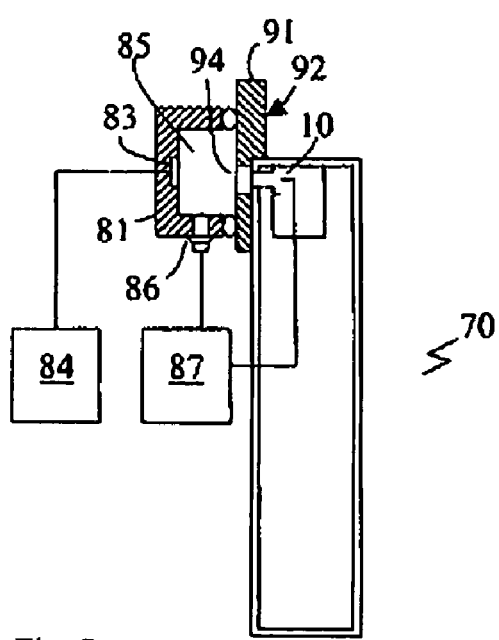
FIG. 9 illustrates a measurement setup for testing the sound quality of a speaker in a phone using a coupler according to an embodiment of the invention, including an adapter to seal off the coupler cavity and a secondary speaker connected to the coupler cavity.
Figure 10:
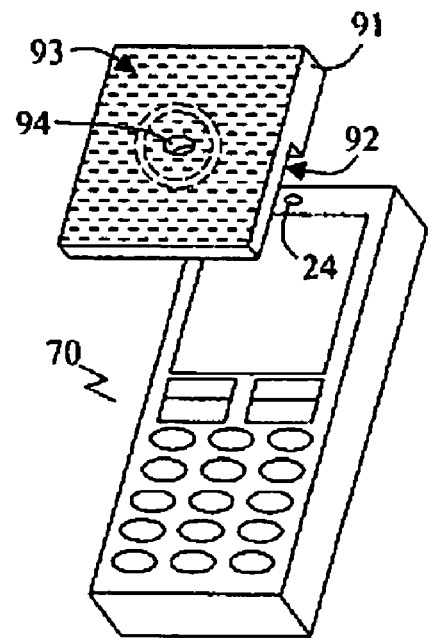
FIG. 10 illustrates parts of the setup of FIG. 9 in a perspective view.

FIGS. 9 and 10 illustrate different features of an embodiment of a test rig arranged in accordance with the invention. Phone 70 is fitted with an adapter 91, typically a plate having a phone-facing side 92 shaped to fit to the front side of phone 70 and a coupler-facing side 93 with a planar portion about a through hole 94. When the adapter 91 is properly fitted to phone 70, through hole 94 surrounds opening 24 in phone 70. Coupler 81 is placed in tight engagement with side 93 of the adapter, thereby forming a cavity 85. In FIG. 10, the portion engaged by seal 82 is schematically illustrated by dashed concentric circles.

Figure 6:
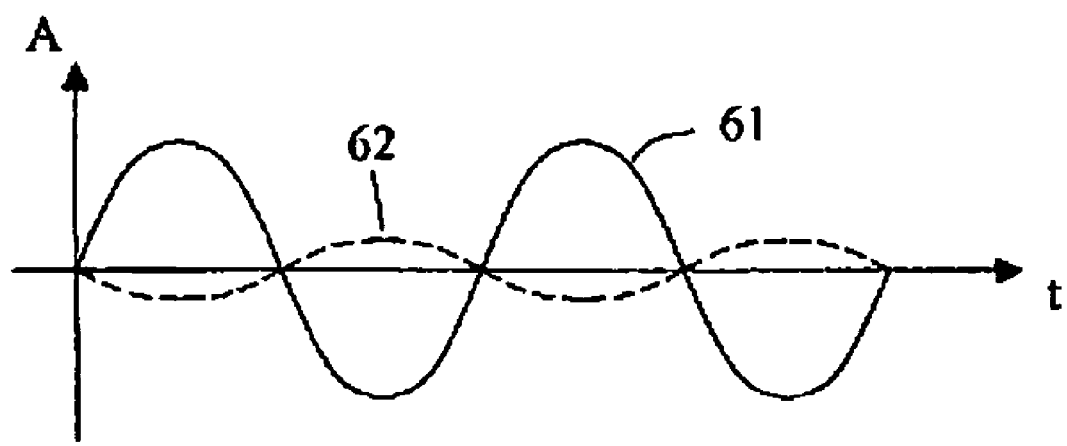
FIG. 6 illustrates audio signals for exciting the speakers in a speaker arrangement according to an embodiment of the invention, where a second speaker is excited to simulate a leak in a cavity to which the first speaker is connected.

Furthermore, a second speaker 86 is provided in acoustic connection with the cavity. Second speaker 86 may be arranged on the inner side of coupler 81, or, as illustrated in the drawing, in connection with a hole provided through the wall of coupler 81. When the sound quality of speaker 10 is to be tested, second speaker 86 is excited simultaneously and in phase with first speaker 10. By doing so the presence of a leak between coupler 81 and phone 70 as in the real case shown in FIG. 7 is simulated, or more correctly, the impedance effect provided by such a leak. Therefore, a speaker signal generator device 87 used in the test rig is configured to excite earphone speaker 10 and second speaker 86 in phase, so that the speaker 10 oscillates towards the interior of cavity 85 when the second speaker 86 oscillates away from the interior of cavity 85. Again, and as schematically illustrated in FIG. 6, the speaker signal generator device 87 is configured to excite the first speaker with an audio signal 61 which has a higher amplitude than the audio signal 62 provided to the second speaker 86. Similar to FIG. 5, a positive amplitude in FIG. 6 represents oscillation towards cavity 85, and a negative amplitude represents oscillation away from cavity 85.

In this embodiment, the object of providing a second speaker acoustically connected to earphone speaker 10 is not to assist or improve the quality of the sound generated by speaker 10. On the contrary, the second speaker acts to represent a leak. As such, the second speaker 86 may be provided as a pistophone rather than a membrane speaker. The amplitude of the audio signal 62 exciting second speaker 86 should be smaller than the amplitude of signal 61 for speaker 10, ring signal 62 merely is intended to represent a perturbation and not the actual signal to be measured. The amplitude ratio is primarily dependent on the structural design of phone 70 and relative area of speaker 10 and 86, and the speaker signal generator device 87 is therefore tuned such that the test rig setup simulates real use as close as possible. In the drawing, the speaker signal generator device 87 is illustrated as being exterior to phone 70. Alternatively, a speaker signal generator device of the phone itself is used, which may be coupled to the second speaker 86 by a connector on phone 70, or different speaker signal generator devices may be employed for first speaker 10 and second speaker 86, connected by through a connector on the phone 70 via a phase-locking unit.

By means of the embodiment of a test rig described with reference to FIGS. 9 and 10, sound quality test can be performed without having to place the phone in a sound-proof compartment, which is clearly advantageous in the production line in terms of cost and production time.

The speaker signal generator device 19 or 87 described herein may comprise separate signal generators and amplifier stages for the two speakers 10, 17 or 10, 86 forming part of the invention. In such a case, a phase-locking unit is preferably connected between the two signal generators. Alternatively, one and the same speaker signal generator device is used for both speakers, with different amplifier stages or signal attenuators for providing different amplitudes in the two audio signals.

In a further embodiment of the invention applied to a phone such as phone 20 of FIGS. 2-4, cavity 11 may be divided into two sub-cavities by means of a partition wall. In order to make it possible for the simultaneously excited second speaker 17 to assist earphone speaker 10, a pressure transferring member is formed in the partition wall. The pressure transferring member may e.g. be an aperture, a membrane, or a conduit formed in the partition wall. The aperture or membrane can then be dimensioned such that the second speaker 17 assists earphone speaker only in selected audio frequency ranges, e.g. at low frequencies <1 kHz.

The invention has been described in terms of several examples of embodiments with reference to the drawings. Modifications of those embodiments are possible, though, without departing from the scope of the invention as defined by the appended claims.

What is claimed is:

1. A speaker arrangement, comprising:
a cavity, defined by a number of boundary walls;
a first speaker having one side acoustically coupled to the cavity;
a second speaker having one side acoustically coupled to the cavity, the second speaker of different physical size than the first speaker, wherein the cavity, the first speaker and the second speaker are sized to fit in a housing of a portable electronic device; and
a speaker signal generator device connected to excite the first speaker as an active speaker for outputting audio for a user and to control excitation of the second speaker in phase with the first speaker so that oscillation of the second speaker adjusts acoustic compliance of the first speaker so as to enhance matching of an output of the first speaker to a cavity impedance of the first speaker.

2. The speaker arrangement of claim 1, wherein the speaker signal generator device is configured to excite the first speaker and the second speaker in phase so as to simultaneously oscillate towards and away from the interior of the cavity.

3. The speaker arrangement of claim 1, wherein the speaker signal generator device is configured to excite the first speaker and the second speaker in phase so that the first speaker oscillates towards the interior of the cavity when the second speaker oscillates away from the interior of the cavity.

4. The speaker arrangement of claim 1, wherein the speaker signal generator device is configured to excite the first speaker at a higher amplitude than the second speaker.

5. The speaker arrangement of claim 1, wherein the speaker signal generator device is connected to the second speaker over a signal attenuator.

6. The speaker arrangement of claim 1, wherein the speaker signal generator device comprises a first generator connected to the first speaker, a second generator connected to the second speaker, and a phase-locking unit connected to the first and second signal generator.

7. The speaker arrangement of claim 1, wherein the first speaker is positioned inside the cavity, attached over an aperture formed in a first boundary wall of the cavity.

8. The speaker arrangement of claim 1, wherein the second speaker is positioned inside the cavity, attached over an aperture formed in a second boundary wall of the cavity.

9. The speaker arrangement of claim 1, wherein the cavity is sealed to the exterior thereof.

10. The speaker arrangement of claim 1, wherein a partition wall is formed in the cavity, dividing the cavity into a first sub-cavity and a second sub-cavity, and wherein a pressure transferring member is formed in the partition wall.

11. The speaker arrangement of claim 10, wherein the pressure transferring member comprises an aperture.

12. The speaker arrangement of claim 10, wherein the pressure transferring member comprises a membrane.

13. The speaker arrangement of claim 1, wherein the second speaker has lower acoustic compliance than the first speaker.

14. A mobile phone, comprising:
a housing defining a portable form factor for the mobile telephone;
a cavity defined within the housing by a number of boundary walls;
a first speaker within the housing, having a first output side coupled to a first opening in the housing, and a first backside acoustically coupled to the cavity;
a second speaker within the housing, having a second output side coupled to a second opening in the housing, and a second backside acoustically coupled to the cavity, and the second speaker of different physical size than the first speaker; and
a speaker signal generator device connected to excite the first speaker as an active earphone speaker for outputting audio for a user when the housing is placed against an ear of the user to hear audio output by the first speaker through the first opening and to control excitation of the second speaker in phase with the first speaker so that oscillation of the second speaker adjusts acoustic compliance of the first speaker so as to enhance matching of an output of the first speaker to a cavity impedance of the first speaker.

15. The mobile phone of claim 14, wherein the speaker signal generator device is configured to excite the first speaker and the second speaker in phase so as to simultaneously oscillate towards and away from the interior of the cavity.

16. The mobile phone of claim 14, wherein the speaker signal generator device is configured to excite the first speaker at a higher amplitude than the second speaker.

17. The mobile phone of claim 14, wherein the first speaker is an earphone speaker configured to operate in phone mode by transmitting sound to a user's ear placed over the first aperture in the housing, the second speaker is connected to an audio player unit and configured to operate in alert mode or audio player mode by transmitting sound to free air through the second aperture in the housing, and wherein the oscillation of second speaker assists the first speaker in phone mode by adjusting acoustic compliance of the first speaker so as to enhance matching of an output of the first speaker to a cavity impedance of the first speaker.

18. The mobile phone of claim 14, wherein the first opening in the housing is formed in a front side of the phone and the first speaker and the second opening in the housing is formed in backside of the phone, wherein the first and second speakers are positioned such that their backsides face each other.

19. The mobile phone of claim 14, wherein the second speaker has lower acoustic compliance than the first speaker.

20. The speaker arrangement of claim 1, wherein the first speaker and the second speaker are excited with the same signal in terms of frequency and phase.

21. The mobile phone of claim 14, wherein the first speaker and the second speaker are excited with the same signal in terms of frequency and phase.

22. The speaker arrangement of claim 1, wherein the second speaker is larger than the first speaker.

23. The speaker arrangement of claim 22, wherein the second speaker is arranged to aid the first speaker in reproducing frequencies of less than 1 kHz.

24. The speaker arrangement of claim 1, wherein the cavity has a volume of one $cm^3$ to five $cm^3$, the first speaker has an area of 40 $mm^2$ to 100 $mm^2$, and the second speaker has an area of 80 $mm^2$ to 300 $mm^2$.

25. The mobile phone of claim 14, wherein the second speaker is larger than the first speaker.

26. The mobile phone of claim 22, wherein the second speaker is arranged to aid the first speaker in reproducing frequencies of less than 1 kHz.

27. The mobile phone of claim 14, wherein the cavity has a volume of one $cm^3$ to five $cm^3$, the first speaker has an area of 40 $mm^2$ to 100 $mm^2$, and the second speaker has an area of 80 $mm^2$ to 300 $mm^2$.

* * * * *